United States Patent
Liu et al.

(10) Patent No.: US 9,537,859 B2
(45) Date of Patent: Jan. 3, 2017

(54) METHOD FOR AUTHENTICATING IDENTITY OF HANDSET USER IN A CLOUD-COMPUTING ENVIRONMENT

(71) Applicant: SHENZHEN JUNSHENGHUICHUANG TECHNOLOGIES CO.,LTD, Shenzhen (CN)

(72) Inventors: Xiaojun Liu, Dongguan (CN); Dongxuan Gao, Dongguan (CN); Minsheng Wang, Dongguan (CN)

(73) Assignee: DONGGUAN RUITENG ELECTRONICS TECHNOLOGIES CO., LTD, Dongguan, Guangdong (CN)

( * ) Notice: Subject to any disclaimer, the term of this patent is extended or adjusted under 35 U.S.C. 154(b) by 78 days.

(21) Appl. No.: 14/622,110

(22) Filed: Feb. 13, 2015

(65) Prior Publication Data
US 2016/0080371 A1 Mar. 17, 2016

Related U.S. Application Data

(63) Continuation of application No. 14/486,136, filed on Sep. 15, 2014, now Pat. No. 8,989,452, which is a
(Continued)

(51) Int. Cl.
*G06K 9/00* (2006.01)
*H04L 29/06* (2006.01)
(Continued)

(52) U.S. Cl.
CPC .......... *H04L 63/0861* (2013.01); *G06F 21/32* (2013.01); *G06F 21/40* (2013.01); *G06F 21/44* (2013.01);
(Continued)

(58) Field of Classification Search
CPC .. G06K 9/00; G06K 9/00221; G06K 9/00228; G06K 9/00248; G06K 9/00268; G06K 9/00275; G06K 9/00281; G06K 9/00288; G06K 9/00295; G06K 9/00973; G06K 9/00993; G06K 9/20; G06K 9/22; G06K 9/36; G06K 9/46; G06K 9/4642; G06K 9/54; G06K 9/62; G06K 9/6201; G06K 9/6212; G06K 9/6214; G06K 9/6215; G06F 21/00; G06F 21/30; G06F 21/305; G06F 21/31; G06F 21/32; G06F 21/40; G06F 21/44; G06F 21/62; G06F 21/6218; G06F 21/70; G06F 21/71; G06F 21/75; G06F 21/78; H04L 9/32; H04L 9/3203; H04L 9/321; H04L 9/3226; H04L 9/3231; H04L 63/00; H04L 63/08; H04L 63/083; H04L 63/0861; H04W 12/00; H04W 12/06; H04W 12/08; H04W 12/12
(Continued)

(56) References Cited

U.S. PATENT DOCUMENTS 6,430,306 B2     8/2002  Slocum et al.
7,602,948 B2 *  10/2009  Ito .................. G06K 9/6217
                                                            382/118
(Continued)

FOREIGN PATENT DOCUMENTS

CN    1629875    6/2005
CN    1972186    5/2007
(Continued)

*Primary Examiner* — Eric Rush
(74) *Attorney, Agent, or Firm* — IPro, PLLC; Na Xu

(57) ABSTRACT

A method for authenticating the identity of a handset user in a cloud-computing environment is provided. The method includes: obtaining, a login account and a password from the user; judging whether the login account and the password are correct; if the login account or the password is incorrect,
(Continued)

refusing the user to access an operating system of the handset; if the login account and the password are correct, sending the login account and the password to a cloud server, wherein the login account and the password correspond to a face sample image library of the user stored on the cloud server; acquiring an input face image of the user; sending the input face image to the cloud server; authenticating, by the cloud server, the identity of the user according to the login account, the password and the input face image.

1 Claim, 3 Drawing Sheets

Related U.S. Application Data continuation-in-part of application No. 14/129,135, filed as application No. PCT/CN2011/076623 on Jun. 30, 2011, now Pat. No. 8,861,798.

(51) Int. Cl.
| | | |
|---|---|---|
| G06F 21/32 | (2013.01) | |
| H04W 12/06 | (2009.01) | |
| G06F 21/40 | (2013.01) | |
| G06F 21/44 | (2013.01) | |
| G06K 9/22 | (2006.01) | |
| G06K 9/62 | (2006.01) | |
| H04L 29/08 | (2006.01) | |

(52) U.S. Cl.
CPC ....... *G06K 9/00221* (2013.01); *G06K 9/00281* (2013.01); *G06K 9/00288* (2013.01); *G06K 9/00979* (2013.01); *G06K 9/22* (2013.01); *G06K 9/6201* (2013.01); *G06K 9/6215* (2013.01); *H04L 63/083* (2013.01); *H04L 63/10* (2013.01); *H04L 67/10* (2013.01); *H04L 67/42* (2013.01); *H04W 12/06* (2013.01); *H04L 2463/082* (2013.01)

(58) Field of Classification Search
USPC ........ 382/100, 115–118, 173, 181, 190, 191, 382/195, 224, 228, 276, 282, 302, 305, 382/312, 313, 325; 235/375, 382; 709/217–219; 726/2, 4–7, 16, 17, 21, 34, 726/35
See application file for complete search history.

(56) References Cited

U.S. PATENT DOCUMENTS

| | | | |
|---|---|---|---|
| 8,194,938 B2 | 6/2012 | Wechsler et al. | |
| 8,396,264 B2* | 3/2013 | Moriyama | G06K 9/00288 382/118 |
| 8,621,583 B2* | 12/2013 | Yang | H04L 9/321 713/182 |
| 2002/0144128 A1* | 10/2002 | Rahman | H04L 63/0861 713/186 |
| 2004/0008873 A1* | 1/2004 | Sogo | G06K 9/00288 382/118 |
| 2005/0078869 A1 | 4/2005 | Kim | |
| 2005/0105779 A1 | 5/2005 | Kamei | |
| 2005/0210267 A1* | 9/2005 | Sugano | H04L 63/0846 713/186 |
| 2009/0140838 A1* | 6/2009 | Newman | G06Q 20/40 340/5.83 |
| 2010/0138914 A1* | 6/2010 | Davis | G06F 21/32 726/19 |
| 2012/0262271 A1* | 10/2012 | Torgersrud | G06F 21/32 382/118 |

FOREIGN PATENT DOCUMENTS

| | | |
|---|---|---|
| CN | 101132557 A | 2/2008 |
| CN | 101393598 | 3/2009 |
| CN | 101557551 | 10/2009 |
| WO | 2010022185 | 2/2010 |

* cited by examiner

METHOD FOR AUTHENTICATING IDENTITY OF HANDSET USER IN A CLOUD-COMPUTING ENVIRONMENT

CROSS REFFERENCE TO RELATED APPLICATIONS

This application is a continuation of U.S. patent application Ser. No. 14/486,136, filed on Sep. 15, 2014, which is a continuation of U.S. patent application Ser. No. 14/129,135, filed on Dec. 24, 2013, which is a continuation of International Application No. PCT/CN2011/076623, filed on Jun. 30, 2011, all of which are hereby incorporated by reference in their entireties.

FIELD OF THE INVENTION

The present invention relates to the field of communication technologies, and in particular, to a method for authenticating the identity of a handset user in a cloud-computing environment.

BACKGROUND OF THE INVENTION

With the widespread popularity of handsets, especially smart handsets, the security of the operating systems of the handsets becomes increasingly important. Currently, most smart handsets only use a login account and a password of a user as a means for identity authentication. However, this method is not secure, and as soon as the login account and the password are stolen by other users, all data on the operating system of the handset is exposed.

The technology using biological features of a human body, especially the face, for security authentication, develops rapidly. However, the computational complexity of the face authentication is high, and the computational resources of a handset are generally limited, so that it is difficult to support the face authentication with a heavy computational burden. In addition, in conventional face authentication systems, face authentication algorithms are rough and thus the probability of misjudgment is very high.

SUMMARY OF THE INVENTION

Embodiments of the present invention provide a method for authenticating the identity of a handset user in a cloud-computing environment. Embodiments of the present invention are based on the cloud computing technology, the cloud server can bear the load of identity authentication, thus improving the security of the operating system of the handset, enhancing the user's experience and raising the precision of the face authentication.

An embodiment of the present invention provides a method for authenticating the identity of a handset user in a cloud-computing environment, wherein the user's handset is connected to the cloud server through a communication network, the cloud server stores a face sample image library corresponding to the user, and the method includes:

obtaining, by the handset, a login account and a password from the user;

judging, by the handset, whether the login account and the password are correct;

if the login account or the password is incorrect, refusing, by the handset, the user to accessan operating system of the handset;

if the login account and the password are correct, sending, by the handset, the login account and the password to the cloud server, wherein the login account and the password correspond to a face sample image library of the user stored on the cloud server;

acquiring, by the handset, an input face image of the user;

sending, by the handset, the input face image to the cloud server;

authenticating, by the cloud server, the identity of the user according to the login account, the password and the input face image;

judging, by the cloud server, whether the user is allowed to access the operating system of the handset;

wherein the step of judging whether the user is allowed to access the operating system of the handset comprises:

step A. determining, by the cloud server, according to the login account and the password, the face sample image library of the user corresponding to the login account and the password;

step B. obtaining, by the cloud server, a face feature similarity value (FFSV) according to the input face image and the face sample image library; wherein the face feature similarity value represents the degree of similarity between the input face image and each face sample image in the face sample image library;

wherein the step of B comprises:

step B 1. obtaining, by the cloud server, a face region image from the input face image;

step B2. calculating, by the cloud server, a first characteristic value of each face sample image in the face sample image library and a second characteristic value of the face region image;

step B3. calculating, by the cloud server, a characteristic distance between the first characteristic value of each face sample image in the face sample image library and the second characteristic value of the face region image, to obtain multiple second characteristic distances; determining, by the cloud server, a face feature similarity value (FFSV) according to the multiple second characteristic distances;

step C. judging, the cloud server, whether the face feature similarity value is larger than a preset threshold, wherein the preset threshold is obtained according to multiple first characteristic distances between each face sample image in the face sample image library;

step D. if the face feature similarity value is not larger than the preset threshold, allowing, by the cloud server, the user to access the operating system of the handset;

step E. if the face feature similarity value is larger than the preset threshold, calculating, by the cloud server, a first number and a second number, wherein the first number is the number of face sample images in the face sample image library corresponding to the first characteristic distances which are larger than the face feature similarity value, and the second number is the number of face sample images in the face sample image library corresponding to the first characteristic distances which are not larger than the face feature similarity value; judging, by the cloud server, whether the first number is larger than the second number;

step F. if the first number is smaller than the second number, refusing the user to access the operating system of the handset;

step G. if the first number is not smaller than the second number, allowing, by the cloud server, the user to access the operating system of the handset.

In the embodiment of the present invention, the cloud server can bear the load of identity authentication, thus improving the security of the operating system of the handset, enhancing the user's experience and raising the precision of the face authentication.

DETAILED DESCRIPTION OF THE EMBODIMENTS

Cloud computing is an Internet-based computation method, by which shared software and hardware resources and information may be provided to computers, handsets and other devices as required. A typical cloud computing provider tends to provide general network service applications, which may be accessed by software such as a browser or other Web services, and the software and data are all stored on a cloud server.

Embodiments of the present invention are based on the cloud computing technology, and the task for authenticating the identity of a handset may be assigned to a cloud server, so that the burden of the handset is reduced, and high-overhead services can be introduced into the handset, thus enhancing the user's experience.

In the embodiments of the present invention, the user's handset is connected to the cloud server through a communication network, the cloud server stores a face sample image library corresponding to the user and may be managed by a telecommunication operator, and the user registers the face sample images with the cloud server of the telecommunication operator when subscribing. The cloud server binds the user's handset number, the login account and password of the operating system of the handset and other information to the face sample image library.

Embodiment 1

Figure 1:
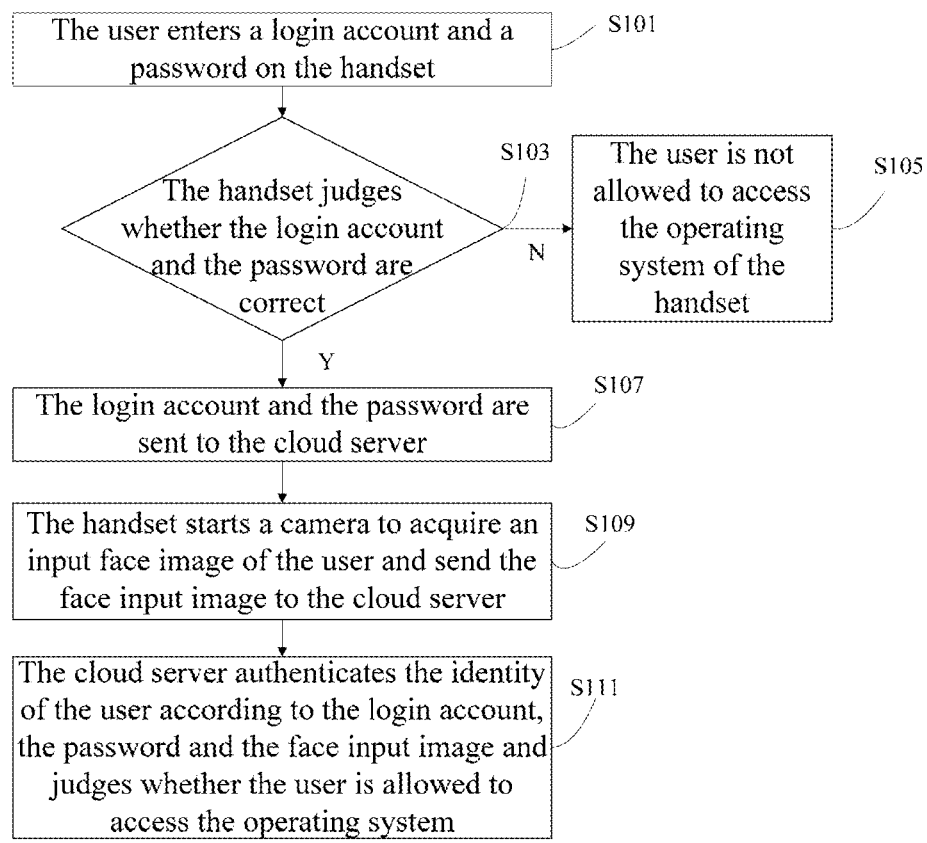
FIG. 1 is a flow chart of a method for authenticating the identity of a handset user according to the first embodiment of the present invention.

FIG. 1 shows a flowchart of a method for authenticating the identity of a handset user according to the first embodiment of the present invention. As shown in FIG. 1, the method includes the following steps:

Step S101: The user enters a login account and a password on the handset.

Step S103: The handset judges whether the login account and the password are correct.

Step S105: If the login account or the password is incorrect, the user is not allowed to access the operating system of the handset and an error is displayed.

Step S107: If the login account and the password are correct, the login account and the password are sent to the cloud server, where the login account and the password correspond to a face sample image library of the user stored on the cloud server.

Step S109: The handset starts a camera to acquire an input face image of the user and send the input face image to the cloud server.

Step S111: The cloud server authenticates the identity of the user according to the login account, the password and the input face image and judges whether the user is allowed to access the operating system of the handset. Step S111 specifically includes:

Step S111-2: The cloud server determines, according to the login account and the password, the face sample image library of the user corresponding to the login account and the password.

Step S111-4: The cloud server obtains a face feature similarity value (FFSV) according to the input face image and the face sample image library; the face feature similarity value represents the degree of similarity between the input face image and each face sample image, and the smaller the face feature similarity value (FFSV) is, the more similar the input face image and each face sample image are.

Step S111-4 specifically includes:

Step S111-4-1: Through face detection, the cloud server obtains a face region image from the face input image; mainly, the face detection method is comparing the face skin color regions of the input face image and the face sample images, and extracting the face region image based on the proportion of the head shape.

Step S111-4-3: The cloud server calculates a first characteristic value of each face sample image in the face sample image library and a second characteristic value of the face region image.

Step S111-4-5: The cloud server calculates an characteristic distance between the first characteristic value of each face sample image in the face sample image library and the second characteristic value of the face region image, to obtain multiple second characteristic distances, and determines a face feature similarity value (FFSV) according to the multiple second characteristic distances; and the face feature similarity value (FFSV) represents the degree of similarity between the input face image and each face sample image, and the smaller the face feature similarity value is, the more similar the input face image and each face sample image are. The face feature similarity value may be the maximum value among multiple second characteristic distances, or may be an average value of multiple second characteristic distances.

Step S111-6: The cloud server judges whether the face feature similarity value is larger than a preset threshold, wherein the preset threshold is obtained from multiple first characteristic distances between each face sample image in the face sample image library; and the preset threshold may be the maximum value in multiple first characteristic distances, or may be an average value of multiple first characteristic distances.

Step S111-8: If the face feature similarity value is not larger than the preset threshold, that is, the similarity of the user's face image and the face sample images in the face sample image library meets security requirements, the user is allowed to access the operating system of the handset.

Step S111-10: If the face feature similarity value is larger than the preset threshold, that is, the similarity of the user's face image and the face sample images in the face sample image library fails to meet security requirements, the cloud server makes statistics respectively regarding how many face sample images whose first characteristic distance is larger or smaller than the face feature similarity value there are, that is, a first number and a second number, wherein the first number is the number of face sample images in the face sample image library corresponding to the first characteristic distances which are larger than the face feature similarity value, and the second number is the number of face sample images in the face sample image library corresponding to the first characteristic distances which are not larger than the face feature similarity value; and then, judges whether the first number is larger than the second number.

Step S111-12: If the first number is smaller than the second number, the user is not allowed to access the operating system of the handset.

Step S111-14: If the first number is not smaller than the second number, the user is allowed to access the operating system of the handset.

The following further describes how the embodiment of the present invention extracts the face image features and determines the first characteristic value of each face sample image in the face sample image library, the second characteristic value of the face region image, the first characteristic distances between the face sample images in the face sample image library, the second characteristic distance between each face sample image in the face sample image library and the face region image, the preset threshold and the face feature similarity value.

A face sample image X (x,y) is taken as an example. The face sample image X (x,y) is a 2-dimensional 64×64, grayscale image, where x represents a horizontal coordinate pixel and y represents a vertical ordinate pixel. The face sample image library consists of M face sample images (M is the number of the face sample images in the face sample image library), and maybe represented by $\{X_i|i=1,2, \ldots, M\}$. The M face sample images are superimposed according to face positions to obtain an average value of all images after the superimposition, that is, $$\overline{X} = \frac{1}{M}\sum_{i=1}^{M} X_i,$$

The difference between each face sample image $X_i$, and the average value $\overline{X}$ is: $\phi_i = X_i - \overline{X}(i=1, \ldots, M)$.

A covariance matrix is constructed: $C=AA^T$. Where, $A=[\phi_1, \phi_2, \ldots, \phi_M]$ is a linear combination of difference vectors. For a 64×64, face image, the size of the covariance matrix C is 4096×4096,, and it is difficult to obtain its eigenvalues and eigenvectors directly. According to the singular value decomposition theorem, the eigenvalues and the eigenvectors of $C=AA^T$, are obtained by finding the eigenvalues and the eigenvectors of $A^TA$. Assuming $\lambda_i(i=1, 2, \ldots, r)$ is r nonzero eigenvalues of the matrix $A^TA$, and $v_i$, is an eigenvector of $A^TA$ corresponding to $\lambda_i$, then the orthogonal normalized eigenvector of $C=AA^T$, is $$u_i = \frac{1}{\sqrt{\lambda_i}} A v_i,$$

and the eigenvalues corresponding to the sample covariance are arranged in order of magnitude: $\lambda_1 \geq \lambda_2 \geq \ldots \geq \lambda_r$. Assuming that the corresponding eigenvector of $\lambda_i$, is $u_i$, each face sample image may be projected to an eigenspace U formed by $u_1, u_2, \ldots, u_r$.

In the specific application, the first d eigenvalues may be selected as the eigenspace, and because the dimensions of this eigenspacev are lower than the dimensions of the original face sample images, after each face sample image is projected to the eigenspace U formed by $u_1, u_2, \ldots, u_r$, the dimensions of the face sample images are decreased greatly, thus achieving the objective of decreasing dimensions and extracting features. The principle for selection is determined according to the energy proportion of the eigenvalues a, and generally, the value of α is from 95% to 99%.

In order to improve the efficiency and precision of feature extraction, the embodiment of the present invention provides a method for finding the eigenvectors of the face sample images by dividing the face sample images into blocks. A face has three distinguishing features: eyes, nose and mouth, and they are respectively located at upper, middle and lower blocks of the face. Therefore, a face image is divided into three independent sub-blocks according to the three distinguishing features, that is, the upper part includes the eyes, the middle part includes the nose, and the lower part includes the mouth.

Through the block division, a face sample image becomes three sub-images, and thus each face sample image $X_i$, may be denoted as $X_i=[X_i^u, X_i^b]^T$, (i=1, 2, ... M), where $X_i^u$, represents an upper sub-block image, $Z_i^m$, represents the middle sub-block image, and $X_i^b$, represents a lower sub-images.

The original one face sample image library becomes three sub-block image libraries independent of each other, that is, $X_i^u, X_i^m$, and $X_i^b$, (i=1, 2, ..., M). If $X_i$, is a matrix of P rows and Q columns, $X_i^u$, is a matrix of $P_1$ rows and Q columns, $X_i^m$, is a matrix of $P_2$ rows and Q columns, and $X_i^b$, is a matrix of $P_3$ rows and Q columns, where $P_1+P_2+P_3=P$.

All upper sub-images of the face sample image library constitute an upper sub-block image library, and similarly, the middle and lower sub-images respectively constitute a middle sub-block image library and a lower sub-block image library. In the process of feature extraction, they will be treated as three independent sub-block image libraries.

Considering that the samples in the face sample image library are limited, the embodiment of the present invention provides the following algorithm which can increase the number of samples without sampling, thus improving the precision of feature extraction. The method specifically includes the following steps:

1. For the face sample image X (an m×n matrix), a dual sample X' is generated, where X'=XY, Y is an n×n matrix in which anti-diagonal elements are 1s and other elements are 0s, that is:

$$X = \begin{bmatrix} X(1,1) & X(1,2) & \ldots & X(1,n) \\ \vdots & \vdots & \ddots & \vdots \\ X(m,1) & X(m,2) & \ldots & X(m,n) \end{bmatrix},$$

$$X' = \begin{bmatrix} X(1,n) & X(1,n-1) & \ldots & X(1,1) \\ \vdots & \vdots & \ddots & \vdots \\ X(m,n) & X(m,n-1) & \ldots & X(m,1) \end{bmatrix}$$

Where, the matrix Y is symmetric, that is $Y=Y^T$; and orthogonal, that is $YY^T=YY^T=I$ (I represents a unit matrix).

X is decomposed into a first sample $X_e=(X+X')/2an_d$, a second sample $X_o=(X-X')/2$, Therefore, the relationship between the average value of the dual samples X' and the covariance matrix C' is as follows:

$$\overline{X}'=\overline{X}Y, C'=Y^TCY$$

The relationship between the average value of the first samples $\overline{X}_e$, and the covariance matrix $C_e$, is as follows:

$$\overline{X}_e=\overline{X}, (I+Y)/2, C_e=(I+Y)^TC(I+Y)/4$$

The relationship between the average value of the second samples $\overline{X}_o$, and the covariance matrix $C_o$, is as follows:

$$\overline{X}_o=\overline{X}, (I-Y)/2, C_o=(I-Y)^TC(I-Y)/4$$

According to mathematical theory, it can be determined that the eigenspace of the first samples $X_e$, and the eigenspace of the second samples $\overline{X}_o$, are orthogonal, and that the eigenspace of X is a direct sum of the eigenspace of the first samples $X_e$, and the eigenspace of the second samples $\overline{X}_o$.

Therefore, the first eigenspace $U_e$, and the second eigenspace $U_o$, may be respectively obtained with respect to $X_e$, and $X_o$, based on the feature extraction algorithm, and then, the eigenvectors with high recognition precision and large variance are selected from the first eigenspace $U_e$, and the second eigenspace $U_o$, to constitute the eigenspace U of X. Then, by using U as a feature transformation matrix, features are extracted through V=AU.

The method according to the embodiment of the present invention is hereinafter described in conjunction with the face sample image library after block division. By taking the upper sub-block image library as an example, a dual sample $X_i^{u'}$, (i=1, 2, ..., M) is generated for each sample $X_i^u$, (i=1, 2, ..., M) in the upper sub-block image library, where $X_i^{u'} = X_i^u Y$, Y is a Q×Q matrix in which the anti-diagonal elements are 1s and other elements are 0s, that is:

$$X_i^u = \begin{bmatrix} X_i^u(1,1) & X_i^u(1,2) & \cdots & X_i^u(1,Q) \\ \vdots & \vdots & \ddots & \vdots \\ X_i^u(P_1,1) & X_i^u(P_1,2) & \cdots & X_i^u(P_1,Q) \end{bmatrix}$$

$$X_i^{u'} = \begin{bmatrix} X_i^u(1,Q) & X_i^u(1,Q-1) & \cdots & X_i^u(1,1) \\ \vdots & \vdots & \ddots & \vdots \\ X_i^u(P_1,Q) & X_i^u(P,Q-1) & \cdots & X_i^u(P,1) \end{bmatrix}$$

$X_i^u$, is decomposed into a first sample $X_{i\ e}^u = (X_i^u + X_i^{u'})/2$, and a second sample $X_{i\ o}^u = (X_i^u - X_i^{u'})/2$. Similarly, a dual sample $X_i^{m'}$, (i=1, 2, ..., M) is generated for each sample $X_i^m$ (i=1, 2, ..., M) in the middle sub-block image library, and a dual sample $X_i^{b'}$, (i=1, 2, ..., M) is generated for each sample $X_i^b$ (i=1, 2, ..., M) in the lower sub-block image library. Similarly, $X_i^m$, is decomposed into $X_{i\ e}^m = (X_i^m + X_i^{m'})/2$, and $X_{i\ o}^m = (X_i^m - X_i^{m'})/2$, and $X_i^b$, is decomposed into $X_{i\ e}^b = (X_i^b + X_i^{b'})/2$, and $X_{i\ o}^b = (X_i^b - X_i^{b'})/2$.

A first eigenspace $U_{i,e}^u$, and a second eigenspace $U_{i,o}^u$, are obtained respectively with respect to $X_{i\ e}^u$, and $X_{i\ o}^u$, based on the foregoing feature extraction algorithm, and then, the eigenvectors with high recognition precision and large variance are selected from the first eigenspace $U_{i,e}^u$, and the second eigenspace $U_{i,o}^u$, to constitute an eigenspace $U_i^u$; and by using $U_i^u$, as a feature transformation matrix, the projection of $X_i^u$, in the eigenspace $U_i^u$, namely $V_i^u$, is extracted through $V_i^u = X_i^u U_i^u$.

A feature extraction is performed with respect to each sample $X_i^m$, and $X_i^b$ (i=1, 2, ..., M) in the middle sub-block image library and the lower sub-block image library by using the same method, where the projection of each sample $X_i^m$, and $X_i^b$ (i=1, 2, ..., M) of the middle sub-block image library and the lower sub-block image library in respective eigenspaces is recorded as $V_i^m$, and $V_i^b$.

Assuming that $V_i^u$, is a $k_{i,1}$-dimensional vector, for an eigenmatrix $$V_i^u = \begin{bmatrix} t^i(1,1) & \cdots & t^i(1,k_{i,1}) \\ \vdots & \ddots & \vdots \\ t^i(P_1,1) & \cdots & t^i(P_1,k_{i,1}) \end{bmatrix}$$

of each sample $X_i^u$, (i=1,2, ..., M) in the upper sub-block image library, a characteristic value $T_i^u$, is calculated respectively, that is:

$$T_i^u = \sqrt{\sum_{n=1,l=1}^{P_1,k_{i,1}} (t^i(n,l))^2}.$$

For the eigenspace $V_i^m$, (a $k_{i,2}$-dimensional vector) and $V_i^b$, (a $k_{i,3}$-dimensional vector) of each sample $X_i^m$, and $X_i^b$, (i=1, 2, ..., M) of the middle sub-block image library and the lower sub-block image library, characteristic values $$T_i^m = \sqrt{\sum_{n=1,l=1}^{P_2,k_{i,2}} (t^i(n,l))^2} \text{ and } T_i^b = \sqrt{\sum_{n=1,l=1}^{P_3,k_{i,3}} (t^i(n,l))^2}$$

calculated respectively.

An average value of the characteristic values $T_i^u$, $T_i^m$, and $T_i^b$, of each sample $X_i^u$, $X_i^m$, and $X_i^b$, of the upper sub-block image library, the middle sub-block image library and the lower sub-block image library is calculated to obtain the first characteristic value $T_i = (T_i^u + T_i^m + T_i^b)/3$, of each face sample $X_i$, in the face sample image library, where (i=1, 2, ..., M).

Described above is the processing of the face sample image library. Corresponding processing is performed for the input face region image by using the same method, that is, dividing the input face region image into blocks, calculating the corresponding characteristic value of each block respectively, finding the sum of these characteristic values to obtain an average value, and finally obtaining the second characteristic value T of the input face region image.

The embodiment of the present invention provides a method for calculating an characteristic distance, i.e. calculating multiple first characteristic distances between face sample images according to a first characteristic value of each face sample image in the face sample image library. The method specifically includes the following steps:

For face sample images $X_i$, and $X_j$, (i, j=1, 2, ..., M, where i≠j), the first Characteristic distance between the two face sample images $D(X_i, X_j) = \sqrt{(T_i - T_j)^2}$, and multiple first characteristic distances between the face sample images are calculated. There are M*(M−1)/2, first characteristic distances in total.

Then, a preset threshold is obtained according to the M*(M−1)/2, first characteristic distances between each face sample image in the face sample image library, where the preset threshold may be the maximum value in the M*(m−1)/2, first characteristic distances, or the average value of the M*(M−1)/2, first characteristic distances.

Similarly, according to the second characteristic value T of the input face region image and the First characteristic value of each face sample image in the face sample image library, multiple second characteristic values $D(X_i, X) = \sqrt{(T_i - T)^2}$ (i=1, 2, ..., M) may be obtained, and there are M second characteristic distances. Then, a face feature similarity value is determined according to the M second characteristic distances, where the face feature similarity value may be the maximum value of the M second characteristic distances or the average value of the M second characteristic distances.

That is, the step of calculating the first characteristic value of each face sample image in the face sample image library includes:

dividing the face sample image $X_i$, into three sub-images, that is, $X_i^u$, $X_i^m$, and $X_i^b$, (i=1, 2, . . . , M);

generating dual samples respectively for $X_i^u$, $X_i^m$, and $X_i^b$;

decomposing $X_i^u$, $X_i^m$, and $X_i^b$, respectively into a first sample $X_{i\_e}^u = (X_i^u + X_i^{u'})/2$, and a second sample $X_{i\_o}^u = (X_i^u - X_i^{u'})/2$, according to the dual samples;

constructing a covariance matrix with respect to the first sample and the second sample respectively;

determining the orthogonal normalized eigenvectors of the covariance matrix of the first sample and the orthogonal normalized eigenvectors of the covariance matrix of the second sample respectively;

according to the first eigenspace formed by the orthogonal normalized eigenvectors of the covariance matrix of the first sample and the second eigenspace formed by the orthogonal normalized eigenvectors of the covariance matrix of the second sample, determining the projections of the first sample and the second sample respectively in the first eigenspace and the second eigenspace;

determining the characteristic values of $X_i^u$, $X_i^m$, and $X_i^b$, according to the projections of the first sample and the second sample in the first eigenspace and the second eigenspace; and determining the first characteristic value of the face sample image $X_i$, according to the characteristic values of $X_i^u$, $X_i^m$, and $X_i^b$.

Calculating the second characteristic value of the input face region image includes the steps of:

dividing the input face region image into three sub-images;

generating corresponding dual samples respectively with respect to the three sub-images;

decomposing the three sub-images into a first sample and a second sample respectively according to the dual samples corresponding to the three sub-images;

constructing a covariance matrix respectively with respect to the first sample and the second sample of the three sub-images;

determining the orthogonal normalized eigenvectors of the covariance matrix of the first sample and the orthogonal normalized eigenvectors of the covariance matrix of the second sample respectively;

according to the eigenspace formed by the orthogonal normalized eigenvectors of the covariance matrix of the first sample and the eigenspace formed by the orthogonal normalized eigenvectors of the covariance matrix of the second sample, determining the projections of the first sample and the second sample in the eigenspace;

determining the characteristic values of the three sub-images according to the projections of the first sample and the second sample in the eigenspace; and determining the second characteristic value of the input face region image according to the characteristic values of the three sub-images.

The embodiment of the present invention further includes: if the first number is not smaller than the second number, updating the face sample image library by using the input face image, where the updating policy may be replacing the oldest face sample image, or replacing the face sample image that is most different from the input face image.

In addition, the first characteristic distance of the face sample image library in the cloud server may be recalculated, and according to the first characteristic distance, a new preset threshold may be determined to replace the preset threshold. Thus, a dynamic update of the face sample image library is implemented.

With the method for authenticating the identity of a handset user according to the embodiment of the present invention, the cloud server can bear the load of identity authentication, thus improving the security of the operating system of the handset, enhancing the user's experience and raising the precision of the face authentication.

Embodiment 2

Figure 2:
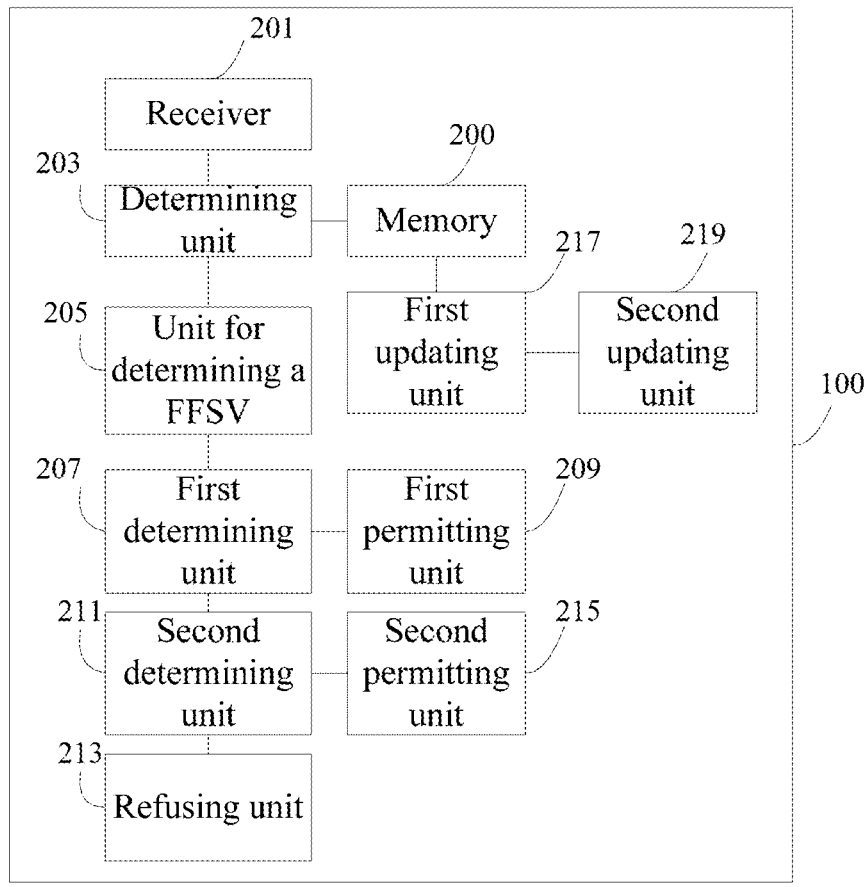
FIG. 2 is a schematic structural view illustrating a cloud server according to the second embodiment of the present invention.
Figure 3:
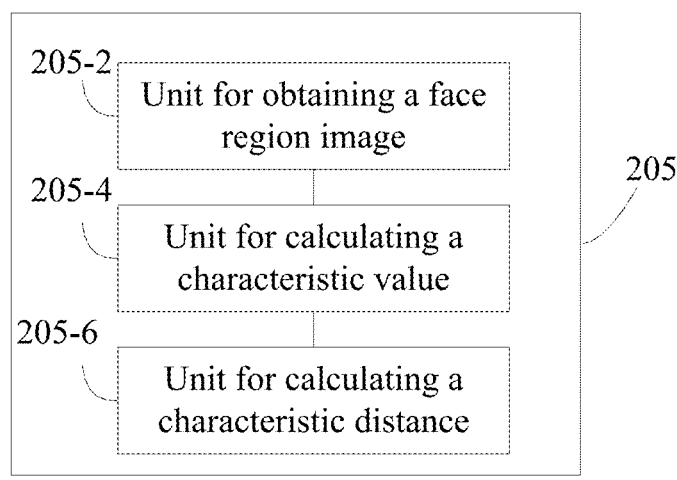
FIG. 3 is a schematic structural view illustrating a unit for determining a FFSV of the cloud server according to the second embodiment of the present invention.

Another embodiment of the present invention further provides a cloud server. As shown in FIG. 2, the cloud server includes:

a memory 200, configured to store a face sample image library of a user;

a receiver 201, configured to receive a login account, a password and an input face image of the user;

a determining unit 203, configured to determine the face sample image library of the user corresponding to the login account and the password; wherein the face sample image library of the user is stored in the memory 200;

a unit for determining a face feature similarity value 205, configured to determine a face feature similarity value (FFSV) according to the input face image and the face sample image library; as shown in FIG. 3, the unit for determining a FFSV 205 includes: a unit for obtaining a face region image 205-2, a unit for calculating a characteristic value 205-4 and a unit for calculating a characteristic distance 205-6, wherein:

the unit for obtaining a face region image 205-2, is configured to obtains a face region image from the input face image through face detection;

the unit for calculating a characteristic value 205-4, is configured to calculate a first characteristic value of each face sample image in the face sample image library and a second characteristic value of the face region image; and the unit for calculating a characteristic distance 205-6, is configured to calculate an characteristic distance between the first characteristic value of each face sample image in the face sample image library and the second characteristic value of the face region image, to obtain multiple second characteristic distances, and determines a face feature similarity value (FFSV) according to the multiple second characteristic distances;

a first determining unit 207, configured to judge whether the face feature similarity value is larger than a preset threshold, wherein the preset threshold is obtained from multiple first characteristic distances between each face sample image in the face sample image library;

a first permitting unit 209, configured to allow the user to access the operating system of the handset, if the face feature similarity value is not larger than the preset threshold;

a second determining unit 211, configured to determine a first number and a second number, where the first number is the number of face sample images in the face sample image library corresponding to the first characteristic distances which are larger than the face feature similarity value, and the second number is the number of face sample images in the face sample image library corresponding to the first characteristic distances which are not larger than the face feature similarity value, if the face feature similarity value is larger than the preset threshold;

a refusing unit 213, configured to refuse the user to access the operating system of the handset, if the first number is smaller than the second number, a second permitting unit 215, configured to allowed the user to access the operating system of the handset, if the first number is not smaller than the second number.

Optionally, the cloud server may further includes: a first updating unit 217, configured to update the face sample image library by using the input face image, if the first number is not smaller than the second number.

Optionally, the cloud server may further includes: a second updating unit 219, configured to Recalculate the first characteristic distance of the face sample image library in the cloud server, and according to the first characteristic distance, replace the preset threshold with the new preset threshold.

the unit for calculating a characteristic value 205-4 includes:

a first dividing unit 205-41, configured to divide the face sample image $X_i$, into three sub-images, that is, $X_i^u$, $X_i^m$, and $X_i^b$ (i=1, 2, ..., M);

a first generating unit 205-43, configured to generate dual samples respectively for $X_i^u$, $X_i^m$, and $X_i^b$;

a first decomposing unit 205-45, configured to decompose $X_i^u$, and $X_i^b$, respectively into a first sample $X_{i\ e}^u = (X_i^u + X_i^{u'})/2$, and a second sample $X_{i\ o}^u = (X_i^u - X_i^{u'})/2$, according to the dual samples;

a first covariance matrix constructing unit 205-47, configured to construct a covariance matrix with respect to the first sample and the second sample respectively;

a first eigenvector calculating unit 205-49, configured to determine the orthogonal normalized eigenvectors of the covariance matrix of the first sample and the orthogonal normalized eigenvectors of the covariance matrix of the second sample respectively;

a first projection calculating unit 205-411, configured to determine the projections of the first sample and the second sample respectively in the first eigenspace and the second eigenspace, according to the first eigenspace formed by the orthogonal normalized eigenvectors of the covariance matrix of the first sample and the second eigenspace formed by the orthogonal normalized eigenvectors of the covariance matrix of the second sample;

a first characteristic value calculating unit 205-413, configured to determine the characteristic values of $X_i^u$, $X_i^n$, and $X_i^b$, according to the projections of the first sample and the second sample in the first eigenspace and the second eigenspace;

a second dividing unit 205-415, configured to divide the input face region image into three sub-images;

a second generating unit 205-417, configured to generate corresponding dual samples respectively with respect to the three sub-images;

a second decomposing unit 205-419, configured to decompose three sub-images into a first sample and a second sample according to the dual samples corresponding to the three sub-images;

a second covariance matrix constructing unit 205-421, configured to construct a covariance matrix respectively with respect to the first sample and the second sample of the three sub-images;

a second eigenvector calculating unit 205-423, configured to determine the orthogonal normalized eigenvectors of the covariance matrix of the first sample and the orthogonal normalized eigenvectors of the covariance matrix of the second sample respectively;

a second projection calculating unit 205-425, configured to determine the projections of the first sample and the second sample respectively in the eigenspace, according to the first eigenspace formed by the orthogonal normalized eigenvectors of the covariance matrix of the first sample and the second eigenspace formed by the orthogonal normalized eigenvectors of the covariance matrix of the second sample;

a second characteristic value calculating unit 205-427, configured to determine characteristic values of the three sub-images according to the projections of the first sample and the second sample in the eigenspace, and the characteristic values of the input face region according to the characteristic values of the three sub-images.

In the embodiment of the present invention, the cloud server can bear the load of identity authentication, thus improving the security of the operating system of the handset, enhancing the user's experience and raising the precision of the face authentication.

Embodiment 3

Figure 4:
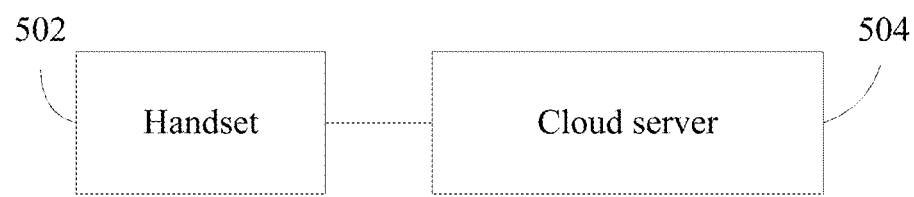
FIG. 4 is a schematic structural view illustrating a network system according to the third embodiment of the present invention.

One embodiment of the present invention further provide a network system as shown in FIG. 4, including a handset 502 and a cloud server 504, wherein the user's handset 502 is connected to the cloud server 504 through a communication network; and the handset is configured to obtain a login account and a password input by the user, judge whether the login account and the password are correct; if the login account or the password is incorrect, allow the user to access the operating system of the handset; if the login account and the password are correct, send the login account and the password to the cloud server, where the login account and the password correspond to a face sample image library of the user stored on the cloud server; acquire an input face image of the user and send the input face image to the cloud server;

the cloud server is configured to store a face sample image library corresponding to the user, authenticate the identity of the user according to the login account, the password and the input face image and judge whether the user is allowed to access the operating system of the handset.

The function specially includes:

Step A. The cloud server determines, according to the login account and the password, the face sample image library of the user corresponding to the login account and the password;

Step B. The cloud server obtains a face feature similarity value (FFSV) according to the face input image and the face sample image library; and the step B especially includes:

B1. Through face detection, the cloud server obtains a face region image from the face input image;

B2. The cloud server calculates a first characteristic value of each face sample image in the face sample image library and a second characteristic value of the face region image;

B3. The cloud server calculates an characteristic distance between the first characteristic value of each face sample image in the face sample image library and the second characteristic value of the face region image, to obtain multiple second characteristic distances, and determines a face feature similarity value (FFSV) according to the multiple second characteristic distances;

Step C. The cloud server judges whether the face feature similarity value is larger than a preset threshold, where the preset threshold is obtained from multiple first characteristic distances between each face sample image in the face sample image library;

Step D. If the face feature similarity value is not larger than the preset threshold, that is, the similarity of the user's face image and the face sample images in the face sample image library meets security requirements, the user is allowed to access the operating system of the handset;

Step E. If the face feature similarity value is larger than the preset threshold, that is, the similarity of the user's face image and the face sample images in the face sample image library fails to meet security requirements, the cloud server makes statistics respectively regarding how many face sample images whose first characteristic distance is larger or smaller than the face feature similarity value there are, that is, a first number and a second number, where the first number is the number of face sample images in the face sample image library corresponding to the first characteristic distances which are larger than the face feature similarity value, and the second number is the number of face sample images in the face sample image library corresponding to the first characteristic distances which are not larger than the face feature similarity value; and then, judges whether the first number is larger than the second number;

Step F. If the first number is smaller than the second number, the user is not allowed to access the operating system of the handset;

Step G. If the first number is not smaller than the second number, the user is allowed to access the operating system of the handset.

The structure of the cloud server can be the one as described in Embodiment 2.

In the embodiment of the present invention, the cloud server can bear the load of identity authentication, thus improving the security of the operating system of the handset, enhancing the user's experience and raising the precision of the face authentication.

Persons of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a Read Only Memory (ROM), a Random Access Memory (RAM), a magnetic disk, and an optical disk.

Finally, it should be noted that the above embodiments are merely provided for describing the technical solutions of the present invention, but not intended to limit the present invention. It should be understood by persons of ordinary skill in the art that although the present invention has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the present invention.

What is claimed is:

1. A non-transitory computer-readable medium storing a program that, when executed by at least one processor, causes the at least one processor to perform a method for authenticating the identity of a handset user in a cloud-computing environment, wherein the handset is connected to a cloud server through a communication network, the cloud server stores a face sample image library corresponding to the user, and the method comprises:

obtaining, by the handset, a login account and a password from the user;

judging, by the handset, whether the login account and the password are correct;

if the login account or the password is incorrect, refusing, by the handset, the user to access an operating system of the handset;

if the login account and the password are correct, sending, by the handset, the login account and the password to the cloud server, wherein the login account and the password correspond to the face sample image library of the user stored on the cloud server;

acquiring, by the handset, an input face image of the user;

sending, by the handset, the input face image to the cloud server;

authenticating, by the cloud server, the identity of the user according to the login account, the password and the input face image;

judging, by the cloud server, whether the user is allowed to access the operating system of the handset;

wherein the step of judging whether the user is allowed to access the operating system of the handset comprises:

step (A) determining, by the cloud server, according to the login account and the password, the face sample image library of the user corresponding to the login account and the password;

step (B) obtaining, by the cloud server, a face feature similarity value, FFSV, according to the input face image and the face sample image library; wherein the face feature similarity value represents the degree of similarity between the input face image and each face sample image in the face sample image library;

step (C) judging, by the cloud server, whether the face feature similarity value is larger than a preset threshold, wherein the preset threshold is obtained according to multiple first characteristic distances between each face sample image in the face sample image library;

step (D) if the face feature similarity value is not larger than the preset threshold, allowing, by the cloud server, the user to access the operating system of the handset;

step (E) if the face feature similarity value is larger than the preset threshold, calculating, by the cloud server, a first number and a second number, wherein the first number is the number of face sample images in the face sample image library corresponding to the first characteristic distances which are larger than the face feature similarity value, and the second number is the number of face sample images in the face sample image library corresponding to the first characteristic distances which are not larger than the face feature similarity value; judging, by the cloud server, whether the first number is larger than the second number;

step (F) if the first number is smaller than the second number, refusing the user to access the operating system of the handset;

step (G) if the first number is not smaller than the second number, allowing, by the cloud server, the user to access the operating system of the handset;

and the step of (B) comprises:

step (B1) obtaining, by the cloud server, a face region image from the input face image;

step (B2) calculating, by the cloud server, a first characteristic value of each face sample image in the face sample image library and a second characteristic value of the face region image;

step (B3) calculating, by the cloud server, a characteristic distance between the first characteristic value of each face sample image in the face sample image library and the second characteristic value of the face region image, to obtain multiple second characteristic distances; and determining, by the cloud server, the face feature similarity value, FFSV, according to the multiple second characteristic distances;

wherein the step of calculating a first characteristic value of each face sample image in the face sample image library comprises:

dividing the face sample image $X_i$ into three sub-images $X_i^u$, $X_i^m$ and $X_i^b$ (i=1, 2, . . . , M), wherein M is the number of the face sample images in the face sample image library;

generating dual samples $X_i^{u'}$, $X_i^{m'}$ and $X_i^{b'}$ respectively for $X_i^u$, $X_i^m$ and $X_i^b$, wherein $X_i^{u'}$ is a dual sample of $X_i^u$, $X_i^{m'}$ is a dual sample of $X_i^m$, and $X_i^{b'}$ is a dual sample of $X_i^b$;

for each sub-image of the face sample image $X_i$;
  decomposing the respective sub-image of the face sample image $X_i$ into a first sample and a second sample, wherein the first sample of the respective sub-image is obtained by adding the dual sample of the respective sub-image to the respective sub-image and dividing the result by 2, and wherein the second sample of the respective sub-image is obtained by subtracting the dual sample of the respective sub-image from the respective sub-image and dividing the result by 2;
  constructing a covariance matrix with respect to the first sample and a covariance matrix with respect to the second sample;
  determining the orthogonal normalized eigenvectors of the covariance matrix of the first sample and the orthogonal normalized eigenvectors of the covariance matrix of the second sample, respectively;
  according to a first eigenspace formed by the orthogonal normalized eigenvectors of a covariance matrix of the first sample and a second eigenspace formed by the orthogonal normalized eigenvectors of the covariance matrix of the second sample, determining a projection of the first sample in the first eigenspace and a projection of a second sample in the second eigenspace; and
  determining a characteristic values of the respective sub-image of the face sample $X_i$ according to the projection of its corresponding first sample in the first eigenspace and the projection of its corresponding second sample in the second eigenspace; and determining the first characteristic value of the face sample image $X_i$ according to the characteristic values determined for its respective sub-images;

and the step of calculating the second characteristic value of the face region image comprises:

dividing the face region image into three sub-images;
generating corresponding dual samples respectively with respect to the three sub-images of the face region image;

for each sub-image of the face region image:
  decomposing the respective sub-image of the face region image into a first sample and a second sample according to the corresponding dual samples of the respective sub-images of the face region image;
  constructing a covariance matrix with respect to the first sample and a covariance matrix with respect to the second sample;
  determining the orthogonal normalized eigenvectors of the covariance matrix of the first sample and the orthogonal normalized eigenvectors of the covariance matrix of the second sample, respectively;
  according to a first eigenspace formed by the orthogonal normalized eigenvectors of the covariance matrix of the first sample and a second eigenspace formed by the orthogonal normalized eigenvectors of the covariance matrix of the second sample, determining a projection of the first sample in the first eigenspace and a projection of the second sample in the second eigenspace; and
  determining a characteristic value of the respective sub-image of the face region image according to the projection of its corresponding first sample in the first eigenspace and the projection of its corresponding second sample in the second eigenspace; and determining the second characteristic value of the face region image according to the characteristic values of its respective sub-images;

and wherein the preset threshold is the maximum value among the multiple first characteristic distances, or an average value of the multiple first characteristic distances.

* * * * *